United States Patent [19]

Prochnow

[11] 4,136,948

[45] Jan. 30, 1979

[54] PHOTOGRAPHIC ENLARGER

[75] Inventor: Claus Prochnow, Braunschweig, Germany

[73] Assignee: Rollei-Werke Franke & Heidecke, Braunschweig, Germany

[21] Appl. No.: 826,403

[22] Filed: Aug. 22, 1977

[30] Foreign Application Priority Data

Sep. 9, 1976 [DE] Fed. Rep. of Germany ... 7628238[U]

[51] Int. Cl.² ............................................. G03B 27/76
[52] U.S. Cl. ........................................ 355/71; 355/18
[58] Field of Search .................... 355/18, 35, 37, 67, 355/71

[56] References Cited

U.S. PATENT DOCUMENTS

| | | | |
|---|---|---|---|
| 3,684,371 | 8/1972 | Weisglass et al. | 355/71 |
| 3,874,792 | 4/1975 | Turner | 355/67 |
| 4,009,383 | 2/1977 | Beier | 355/67 X |
| 4,077,716 | 3/1978 | Gandini | 355/67 |

Primary Examiner—Richard A. Wintercorn
Attorney, Agent, or Firm—Ernest F. Marmorek

[57] ABSTRACT

The invention relates to a photographic enlarger having an exchangeable film trap disposed in a projection head for receiving film, a magnifying lens disposed on one side of the film trap, and an insert member including a light deflection mirror and a condenser abutting the film trap; the insert member is disposed on the other side of the film trap.

7 Claims, 3 Drawing Figures

PHOTOGRAPHIC ENLARGER

BACKGROUND OF THE INVENTION

In order to enlarge a negative of a predetermined format, for example, to enlarge a negative having a size of 24 × 36 millimeters to a negative having a size of 60 × 70 millimeters, it is necessary to exchange not only a magnifying lens but also the condenser. For this reason, in a known enlarger the aforesaid condenser in a necessarily required light-deflection mirror is disposed in a single housing, when the projection or enlargement lamp is arranged horizontally, the housing being exchangeable from the top side of the projection head. The insert member abuts against a stop in the projection head itself. To permit exact abutment of a negative or film against the condenser, or against an opaque disc disposed between the condenser and the film or negative, a special mechanism is provided, which presses the film trap, or the carrier of the film, or negative, upon insertion of the film into the condenser.

Such a special mechanism for displacement in a vertical direction of the film trap, or the carrier of the film, in conjunction with the mechanism facilitating the exchange of the condenser system from the top side of the projection head, is not inexpensive.

SUMMARY OF THE INVENTION

It is therefore one of the objectives of the present invention to reduce the expense of an enlarger of the aforecited type, and in particular to improve the arrangement between the condenser and the film trap, or carrier of the film or negative, as well as to facilitate an exchange of the condenser, so that such an exchange is carried out easily and quickly, and so that the construction of the enlarger is very much simplified.

This objective, according to the present invention, is attained by the photographic enlarger including a projection head, and a housing, wherein the projection head has a projection axis and an exchangeable film trap for receiving film, a magnifying lens disposed on one side of the film trap, and an insert member including a light-deflection mirror and a condenser abutting the film trap. The projection head is split into first and second parts at least within the region of the film trap along a plane at an angle to the projection axis, and the first part includes the insert member. The second part is detachable from the first part, and includes a magnifying lens. The insert member may be guided within the first part in opposite predetermined directions, and resiliently yieldable means are disposed in the first part for exerting a force on the insert member in one of the predetermined directions, so as to press the insert member and the condenser against the film trap. Manually releasable locking means are disposed in the projection head for locking the insert member in a predetermined position against the force of the resiliently yieldable means.

In lieu of the film trap it is, of course, also possible to simply use a carrier for a film or a negative, so that in what follows the expression "film trap" will be used synonymously for both a film trap which may be continuously passed through the projector, as well as for a simple carrier of the film or negative.

The resiliently yieldable means are preferably implemented by means of a spring or springs, and it is an advantage of the present invention that the gear normally used for lifting or lowering of the film trap, or of the condenser may be dispensed with, so that the pressing of the condenser to the film trap can be accomplished by means of a single spring. The spring performs additionally the function of holding the insert member in the projection head in cooperation with the locking means and guiding means disposed in the projection head, and which additionally serve upon release of the locking means as a release spring for the insert member.

Due to the fact that the insert member is vertically displaceable in a projection head against the force of a spring, a film or negative may be placed between the magnifying lens and the condenser by a simple placement of a film trap, by moving the displaceable insert member, or by lifting of the insert member by means of a handle provided on the insert member, in one version of the present invention.

Additionally, an exchange of the insert member requires only very few steps, according to the present invention. After the film trap has been withdrawn, and a lower portion of the projection head has been swung away, the insert member falls, or slides out downwardly, following release of the locking means, due to the pressure of the spring. A new insert is then slid into the enlarger from below and is pressed vertically into the projection head, until the locking means locks. After swinging back the lower portion, the film trap with the inserted film may be again slid into the projection head, the condenser then automatically abutting the film trap. A simple carrier for the film, or negative, may be connected with the lower portion of the projection head, so that the projection head automatically reassumes its correction position, if the lower portion of the projection head is again swung towards the upper portion of the projection head. By lifting off the insert member by means of a handle, it is possible to gain a space between the carrier of the film or negative, and the condenser for insertion of the film or negative, the film or negative being pressed by the condenser against the carrier of the film or negative upon release of the handle. In a further development of the invention, there are included guidance means disposed in the first part of the projection head for guiding the insert member, and for forming a support for the resiliently yieldable means. The guidance means preferably includes two juxtaposed rails extending from the projection housing inwardly in one of the predetermined directions, and the rails have respective guidance slits. Additionally, a guidance rod is disposed in the insert member, and the resiliently yieldable means includes a spring disposed between the guidance rod, the housing and the juxtaposed rails.

By this means there is created on one end a guidance for the insert member, which is vertically displaceable in the projection head, and there is simultaneously formed a holder for the compression spring, so that it cannot fall out, if the insert member is removed. In a further development of the present invention, the insert member has two walls disposed opposite one another, and the light-deflection mirror forms a third wall of the insert member, and is disposed at an angle with respect to the oppositely disposed walls. The oppositely disposed walls extend in a predetermined region beyond the third wall, and the guidance rod is supported by the oppositely disposed walls within the predetermined region.

The housing is preferably formed with a plurality of walls, and the enlarger includes a guidance track disposed in the first part at a distance from one of the walls for facilitating the insertion of the insert member into the projection head with a predetermined amount of play.

The manually releasable locking means preferably include two lugs projecting from oppositely disposed sides of the insert member, and each lug has a respective recess. Two springs, for example leaf springs, are disposed on two of the holes adjacent to the lugs, and engage the recesses, respectively, when the locking means lock the insert member in a predetermined position. The enlarger preferably includes handling means, such as a handle, connected to the insert member, and projecting from the projection head.

BRIEF DESCRIPTION OF THE DRAWING

For a fuller understanding of the nature and objects of the invention, reference should be had to the following detailed description, taken in connection with the accompanying drawngs, in which.

DESCRIPTION OF THE PREFERRED EMBODIMENTS

Figure 1:
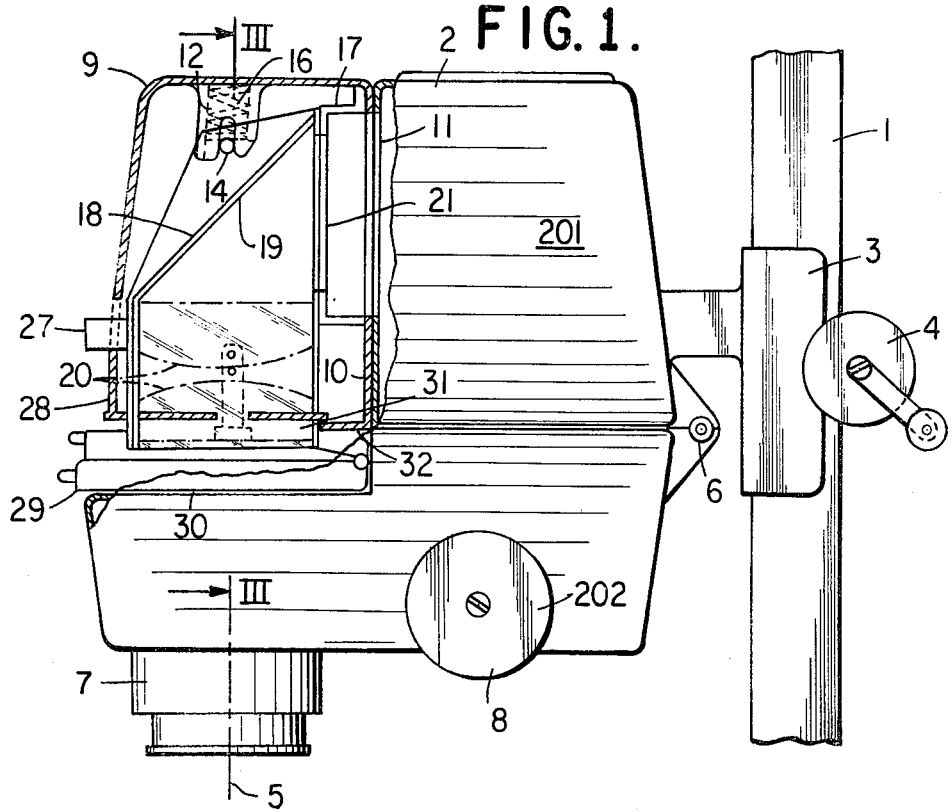
FIG. 1 shows a side view of the enlarger, according to the present invention, in partial section.
Figure 2:
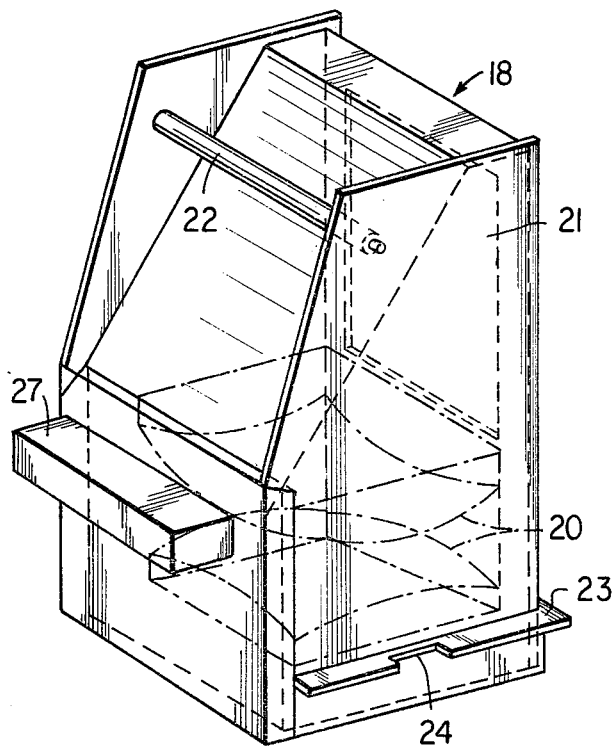
FIG. 2 is a perspective view of the insert member, containing the condenser and a light-deflection mirror.
Figure 3:
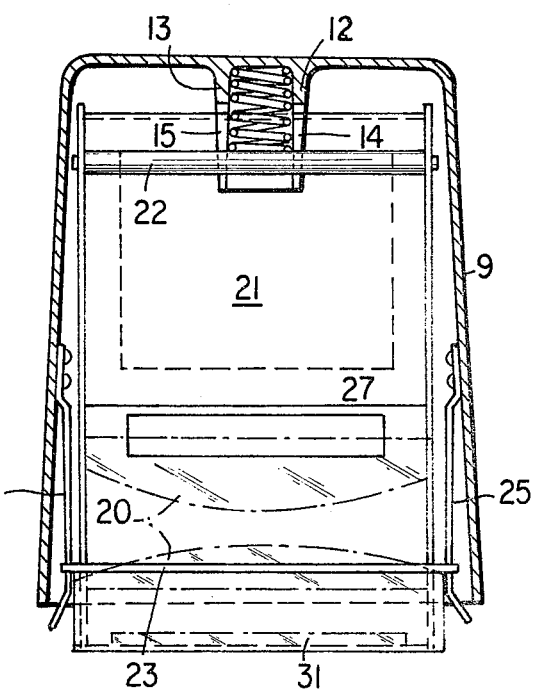
FIG. 3 is a section of the housing of the projection head and the insert member along the line 3—3 of FIG. 1.

In carrying the invention into effect, the enlarger, according to the present invention, includes a tripod, or guidance stand 1, and a projection-or enlarging head 2, which is vertically adjustable by means of the slidable guidance 3, and a frictional crank 4 along the stand 1.

The enlargement-or projection head 2 is split in a direction transverse to the axis of projection 5, and includes an upper part 201, which is rigidly secured to the slidable guidance 3, and a lower part 202, which may be swung away from the upper portion by means of a hinge 6.

The lower portion 202 carries the magnifying lens 7 and a handwheel 8 adjustable to focus the magnifying lens 7. A housing 9 of the upper portion 201 of the projection head 2 is split by means of wall 10 into a front portion and a rear portion, the wall 10 having an opening 11 to permit light to pass therethrough. In the rear part of the upper portion 201 of the projection head 2, there is disposed a non-illustrated projection lamp. In the front portion of the projection head 2, there are disposed on the upper wall or ceiling of the housing rails 12 and 13, which are formed with guidance slots 14 and 15, respectively, and between which there is held a helical spring 16. There are furthermore provided guide tracks 17 on the dividing wall 10 on either side of the opening 11 for an insert member 18, which is disposed in the front portion of the upper projection head portion 201, and may be displaced in a vertical direction. This exchangeable insert member 18, which includes a light-deflection mirror 19, and a dual condenser 20, has four walls connected to one another, its upper cover surface being formed by the light-deflection mirror 18 subtending an angle of 45° with the projection axis.

The rear portion of the insert member 18 is formed with an opening 21 corresponding to the opening 11 in the dividing wall 10. Two side walls of the insert member 18 project beyond the cover formed by the light-deflection mirror 18, and form a support for a guidance rod 22, which is guided in the guidance slots 14 and 15 of the rails 12 and 13, respectively, upon the insert member 18 being inserted into the projection head 2. The compression spring 16 abuts the inner housing wall of the upper portion 201 of the projection head, and the guidance rod 22. In the vicinity of its lower edge, the insert member is formed on the three sides thereof, namely with the exception of the front side, with lugs 23 projecting therefrom. Two of the lugs 23 disposed on opposite sides of the insert member 18 are formed with respective recesses 24, and two walls of the housing of the upper projection head 201 adjoining respective lugs 23 formed with the recesses 24 carry T-shaped leaf springs 25 and 26 riveted thereon, respectively, with each leaf spring having a bottom portion inclined at an angle of about 45° with the vertical, and projecting from the underside of the upper projection head portion 201. As a result of the pressure exerted by the compression spring 16, corresponding lugs 23 abut the leaf springs 25 and 26, respectively, so that the insert member 28 which is slidable vertically in the projection head 2 is kept in a lower position. The insert member 18 is formed on its front side with a handle 27, which projects through an opening 28 formed in the front portion of the upper portion 201 of the projection head 2. The insert member 18 may be lifted upwardly within certain limits by means of the handle 18 acting against the force of the spring 16.

Between the magnifying lens 7 and the insert member 18, there is disposed a film trap 29 which may be pulled out, and which is shown as a book-handling member. This book-handling member 29 abuts a plane surface 13 disposed on the bottom half 202 of the projection head 2, the underside of the insert member 18 and its condenser 20, or an opaque disc 31 of an alternately inserted insert member abutting the film trap, or the film held by the film trap, as a result of the action of the compression spring 16. The film trap 29 may be pulled out in a direction transverse to the axis of projection 5, the insert member 18 then moving as a result of the action of the compression spring 16 in a downward direction, as can be best seen from FIG. 1, until the lugs 23 abut the respective T-shaped leaf springs 25 and 26. The film trap 29 is formed with two portions which can be swung open, and upon these portions being swung open, the film or negative may be exchanged, and the film trap 29 may again be slid between the insert member 18 and the magnifying lens 7 along the surface 13. A lug 32 of the film trap, which, upon the film trap being inserted into the enlarger, is disposed below the insert member 18 and moves the insert member upwardly, as the film trap 29 is moved inwardly, makes it unnecessary to lift the insert member 18 by means of the handle 27. The handle 27 is only needed, if a simple film holder is inserted instead of the film trap, in which the film is placed below the insert member and must be moved. In order to remove the insert member 18, which may, for example, become necessary if the film format is to be changed, the film trap 29 is to be pulled out, the non-illustrated locking means of the lower projection head portion 202 with the upper projection head portion is to be released, and the lower projection head portion 201 is to be released, and the lower projection head portion 202 is to be swung out. Subsequently, the two leaf springs 25 and 26 projecting downwardly from the upper projection head portion 201 are to be pressed outwardly, until the T-shaped leaf springs 26 and 25 project beyond respective lugs 23. This causes release of the locking means, and the insert member 18 is pushed downwardly by the compression spring 16. The insert member 18 is then exchanged against another insert member, and then simply slid from below into the upper portion 201 of the projection head 2. During its vertical upward motion, the insert member 18 is guided by the guidance rails 17, until its guidance rod 22 enters the guidance slots 14 and 15 of the guide rails 12 and 13, respectively. The insert member 18 is to be displaced against the action of the compression spring 16, until the leaf springs 25 and 26 nestle within the respective recesses of the lugs 23. Afterwards, the lower portion 202 of the projection head 2 must be swung upwardly towards the upper portion 201, and locked thereto. The film trap 29 is slid inwardly, the insert member 18 then moving slightly upwardly, so as to render the locking means consisting of the leaf springs 25 and 26, and the lugs 23 formed with respective recesses 24, ineffective.

The insert member 18, or the condenser 20 disposed on the lower side of the insert member 18, or the opaque disc 31, are pressed against the film or negative under the action of the compression spring 16.

Having thus described the invention, what I claim as new and desire to be secured by Letters Patent, is as follows:

1. A photographic enlarger, comprising in combination:
    a projection head including a housing, said projection head having a projection axis and an exchangeable film trap for receiving a film,
    a magnifying lens disposed on one side of said film trap,
    an insert member including a light-deflection mirror and a condensor abutting the film trap, said projection head being split into first and second parts at least within the region of said film trap along a plane at an angle to the projection axis, the first part including said insert member, the second part being detachable from the first part and including said magnifying lens, sad insert member being guidable within said first part in opposite predetermined directions,
    resiliently yieldable means disposed in said first part for exerting a force on said insert member in one of said predetermined directions so as to press said insert member and said condensor against said film trap, and
    manually releasable locking means disposed in said projection head for locking said insert member in a predetermined position against the force of said resiliently yieldable means.

2. A photographic enlarger according to claim 1, further comprising guidance means disposed in said first part for guiding said insert member and for forming a support for said resiliently yieldable means.

3. A photographic enlarger according to claim 2, wherein said guidance means includes two juxtaposed rails extending from the projection head housing inwardly in said one of said predetermined directions, said rails having respective guidance slits, and further comprising a guidance rod disposed on said insert member, and wherein said resiliently yieldable means includes a spring disposed between said guidance rod, said housing, and said juxtaposed rails.

4. An enlarger according to claim 3, wherein said insert member has two walls disposed opposite one another, and wherein said light-deflection mirror forms a third wall of said insert member and is disposed at an angle with respect to the oppositely disposed walls, the oppositely disposed walls extending in a predetermined region beyond said third wall, said guidance rod being supported by said oppositely disposed walls within said predetermined region.

5. An enlarger according to claim 1, wherein said housing is formed with a plurality of walls, and further comprising guidance track means disposed in said first part at a distance from one of said walls for facilitating the insertion of said insert member into said projection head with a predetermined amount of play.

6. An enlarger according to claim 5, wherein said manually releasable locking means includes two lugs projecting from oppositely disposed sides of said insert member, each lug having a respective recess, and two springs disposed on two of said walls adjacent said lugs, and engaging said recesses, respectively, when said locking means lock said insert member in said predetermined position.

7. An enlarger according to claim 1, further comprising handling means connected to said insert member and projecting from said projection head.

* * * * *